United States Patent
Hanashiro et al.

(10) Patent No.: US 8,945,438 B2
(45) Date of Patent: Feb. 3, 2015

(54) LENS FORMING METAL MOLD, LENS FORMING METHOD AND PICKUP DEVICE

(75) Inventors: Shungo Hanashiro, Kanagawa (JP); Akihiro Sugiyama, Tochigi (JP); Hiroshi Kanazawa, Saitama (JP)

(73) Assignee: Hoya Corporation, Tokyo (JP)

( * ) Notice: Subject to any disclaimer, the term of this patent is extended or adjusted under 35 U.S.C. 154(b) by 639 days.

(21) Appl. No.: 13/039,587

(22) Filed: Mar. 3, 2011

(65) Prior Publication Data
US 2011/0215488 A1    Sep. 8, 2011

(30) Foreign Application Priority Data
Mar. 5, 2010    (JP) ................................. 2010-049046

(51) Int. Cl.
B29D 11/00    (2006.01)

(52) U.S. Cl.
USPC .......... 264/1.1; 264/2.5; 264/328.1; 425/175; 425/808

(58) Field of Classification Search
USPC ......... 264/1.1, 2.5, 219, 328.1; 425/808, 175, 425/542
See application file for complete search history.

(56) References Cited

U.S. PATENT DOCUMENTS

| 8,179,619 B2 | 5/2012 | Kuwa et al. |
| 2010/0002315 A1 | 1/2010 | Kuwa et al. |

FOREIGN PATENT DOCUMENTS

| JP | 61-261015 | 11/1986 |
| JP | 9-131802 | 5/1997 |
| JP | 2008-126611 | 6/2008 |
| JP | 2008-130160 | 6/2008 |
| JP | 2010-12694 | 1/2010 |

OTHER PUBLICATIONS

U.S. Appl. No. 13/039,601, to Shungo Hanashiro et al., filed Mar. 3, 2011.
Japan Office Action, dated Nov. 12, 2013 along with an English language translation thereof.

*Primary Examiner* — Mathieu D. Vargot
(74) *Attorney, Agent, or Firm* — Greenblum & Bernstein, P.L.C.

(57) ABSTRACT

A metal mold including: a first inner metal mold which forms a first lens surface and a first flat surface portion of a lens; a first outer metal mold which forms a second flat surface portion; a second inner metal mold which forms a second lens surface and a third flat surface portion; and a second outer metal mold which forms a fourth flat surface portion, and wherein a first protruded portion which forms a first concaved portion on the lens is formed all around an outer periphery of the first inner metal mold, the first concaved portion serving as clearance for a burr, and a second protruded portion which forms a second concaved portion on the lens is formed all around an outer periphery of the second inner metal mold, the second concaved portion serving as clearance for a burr.

4 Claims, 2 Drawing Sheets

LENS FORMING METAL MOLD, LENS FORMING METHOD AND PICKUP DEVICE

TECHNICAL FIELD

The present invention relates to a lens forming metal mold, a lens forming method, and a pickup device.

BACKGROUND

An optical disc drive for reading information from an optical disk, such as CD or DVD, has a pickup device. The pickup device includes at least one laser light source and a lens for focusing a laser light beam emitted from the laser light source on an optical disk.

In general, the lens is a resin molded product formed by mold injection. One example of metal molds for forming a lens is shown in Japanese Patent Provisional Publication No. 2008-126611 (hereafter, referred to as a patent document 1). In order to adjust thickness of the lens, as the metal mold for forming the lens, it is preferable to use an inner metal mold for mainly forming lens surfaces of the lens in combination with an outer metal mold for forming a periphery of the lens.

With the lens of the above-described configuration, since a boundary of the inner metal mold and the outer metal mold is positioned at the periphery of the lens, there is some possibility that burrs occur at the periphery of the lens. On the periphery of one of the lens surfaces (positioned on a side of the laser light source, when the lens is attached to the pickup device) of the lens, a mounting surface for mounting the lens to a lens holder of the pickup device is formed. Since the burrs and the lens holder interfere with each other, the mounting surface cannot be accurately mounted to the lens holder, without removing the burrs. In addition, a cap for preventing contact of the lens with the optical disk is attached to the periphery of the other one of the lens surfaces (positioned on the side of the optical disk, when the lens is attached to the pickup device) of the lens. However, without removing the burrs, there is some possibility that tips of the burrs are placed closer to a side of the disk. Therefore, it is possible that the optical disk is damaged by contacting with the burrs.

SUMMARY

The present invention is achieved so as to solve the above problems. The present invention is advantageous in that it provides a lens forming metal mold and a lens forming method for forming a lens such that the lens can be accurately attached to a lens holder without removing burrs and such that contact of the lens with an optical disk can be prevented by a cap, and provides a pickup device using the lens.

According to an aspect of the invention, there is provided a metal mold for forming a lens, the lens being made of resin and the lens having a first lens surface and a second lens surface, the second lens surface formed on a reverse side of the first lens surface. The metal mold comprises: a first inner metal mold which forms the first lens surface and a first flat surface portion, the first flat surface portion being formed around an outer periphery of the first lens surface, and the first flat surface portion being a ring-shaped surface perpendicular to an optical axis of the lens; a first outer metal mold which forms a second flat surface portion, the second flat surface portion being formed around an outer periphery of the first flat surface portion and positioned closer to a side of the second lens surface than the first flat surface portion, and the second flat surface portion being a ring-shaped surface perpendicular to the optical axis of the lens; a second inner metal mold which forms the second lens surface and a third flat surface portion, the third flat surface portion being formed around an outer periphery of the second lens surface, and the third flat surface portion being a ring-shaped surface perpendicular to the optical axis of the lens, and a second outer metal mold which forms a fourth flat surface portion, the fourth flat surface portion being formed around an outer periphery of the third flat surface portion and positioned closer to a side of the first lens surface than the third flat surface portion, and the fourth flat surface portion being a ring-shaped surface perpendicular to the optical axis of the lens. In this configuration, a first protruded portion which forms a first concaved portion on the lens is formed all around an outer periphery of the first inner metal mold, the first concaved portion serving as clearance for a burr which can occur at a boundary of the first outer metal mold and the first inner metal mold when the lens is formed. A second protruded portion which forms a second concaved portion on the lens is formed all around an outer periphery of the second inner metal mold, the second concaved portion serving as clearance for a burr which can occur at a boundary between the second outer metal mold and the second inner metal mold when the lens is formed.

In the metal mold of the above configuration, the first protruded portion and the second protruded portion are formed so as to form the concaved portions serving as clearance for the burrs between the first outer metal mold and the first inner metal mold, and between the second outer metal mold and the second inner metal mold, namely, at positions where burrs can occur. Therefore, the burr occurs on a position shifted toward the side of the second lens surface from the position of the first flat surface portion, corresponding to an amount of the first concaved portion. The first flat surface portion is used as a mounting surface. Hence, heights of tips of the burr at the side of the first lens surface from the second surface portion are regulated to be low. Thus the tips of the burr do not protrude from the first flat surface portion. Therefore, even if the burr is not removed, the burr does not interfere with the lens holder and it can be ensured that the first flat surface portion, which is the mounting surface, is mounted to the lens holder of the pickup device. Similarly, the height of the burr formed at a side of the second lens surface from the fourth surface portion is regulated to be low by the second concaved portion formed by the second protruded portion formed on the second inner metal mold. Thus, even if the burr is not removed, positions of the tips of the burr at the side of the second lens surface are lower than position of a cap attached to the lens. Hence, the optical disk is not damaged by the burr.

In at least one aspect, the first protruded portion formed around the first inner metal mold may be formed such that a position on the first protruded portion formed around the first inner metal mold approaches to the second lens surface of the lens as the position on the first protruded portion separates from the optical axis of the lens. The second protruded portion formed around the second inner metal mold may be formed such that a position on the second protruded portion formed around the second inner metal mold approaches to the first lens surface of the lens as the position on the second protruded portion separates from the optical axis of the lens.

In at least one aspect, a hole formed in the first outer metal mold for accommodating the first inner metal mold therein and a hole formed in the second outer metal mold for accommodating the second inner metal mold therein may be circular holes having same diameters. Each of the circular holes is formed to have a center equal to a position of the optical axis of the lens.

With such a configuration, both of the hole of the first outer metal mold and the hole of the second outer metal mold can be formed at the same time by overlapping the first outer metal mold and the second outer metal mold and punching them with a drill. Therefore a cost for manufacturing the metal mold is reduced.

According to another aspect of the invention, there is provided a lens forming method, comprising: forming a lens injecting a molten resin material into one of the above described metal molds.

According to another aspect of the invention, there is provided a pickup device, comprising: a lens formed with the above described lens forming method; and a lens holder for holding the lens at the first flat surface portion.

In at least one aspect, the pickup device may further include a cap for covering the fourth flat surface portion of the lens.

As described above, according to the present invention, a lens forming metal mold and a method of fainting a lens such that the lens can be mounted accurately to a lens holder without removing buns, and such that contact of the lens with an optical disk is prevented with a cap, and a pickup device using the lens can be realized.

DETAILED DESCRIPTION OF EMBODIMENTS

Figure 1:
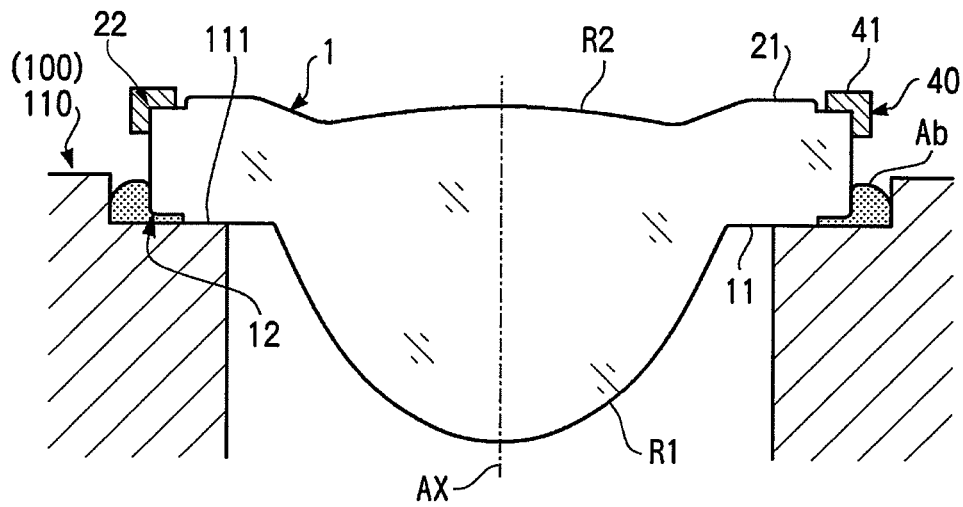
FIG. 1 is a sectional view of a lens and a pickup device according to an embodiment of the present invention.

Hereinafter, an embodiment of the present invention is explained using figures. FIG. 1 is a sectional view of a lens and a pickup device of the embodiment. The pickup device 100 of the embodiment is a device for reading out data recorded on an optical disk, or for recording data on an optical disk. The lens 1 is fixed to a lens holder 110 inside of the pickup device 100.

As shown in FIG. 1, the lens 1 is a lens such that a first lens surface R1 is formed on one of its surfaces (the lower side in the figure) and a second lens surface R2 is formed on the other one of its surfaces (the upper side in the figure). Both of the first lens surface R1 and the second lens surface R2 are convex surfaces, and the lens 1 functions as a convex lens.

The pickup device 100 causes a laser beam from a laser source to enter the lens 1, and irradiates an optical disk with the laser beam collected by the lens 1. When data recorded on an optical disk is read out, a laser beam reflects on the optical disk, subsequently, the laser beam enters a photodetector of the pickup device 100 through the lens 1. Namely, the laser beam reflects on the optical disk is eventually read by the photodetector. Here, the laser source and the photodetector of the pickup device 100 are placed on the side of the first lens surface R1, and, on the other hand, the optical disk is placed on the side of the second lens surface R2.

It is preferable that a distance between the lens 1 (the second lens surface R2) and the optical disk is short, namely, it is preferable to set a focal length to an infinitesimal length, so as to ensure that data is read out from the optical disk, or so as to ensure that data is recorded on the optical disk. In the embodiment, an optical power of the lens is enlarged by setting a convexity of the first lens surface R1 to a large convexity (namely, by setting a radius of curvature of the first lens surface R1 to a small length). Therefore, a position of a focal point of the lens 1 is in close proximity to the second lens surface R2.

The lens holder 110 is a base for supporting the lens 1 on the side of the first lens surface R1. As shown in FIG. 1, around an outer circumference of the first lens surface R1 of the lens 1, a mounting surface 11 (a first flat surface portion), which is a ring-shaped surface perpendicular to an optical axis AX of the lens 1, is formed. Further, on the lens holder 110, a holding surface 111, which contacts with the mounting surface 11 of the lens 1, is formed. The lens 1 is fixed on the holder 110 by placing the mounting surface 11 of the lens 1 on the holding surface 111 of the lens holder 110 and, subsequently, injecting an adhesive Ab into a corner 12 of the mounting surface of the lens 1.

As described, the optical disk is in close proximity to the second lens surface R2 of the lens 1. Further, a cap 40 made with soft resin is attached at a corner 22 of the lens 1 so as not to damage the optical disk by contacting the optical disk rotating at a high speed with the corner 22 at the side of the second lens surface R2 of the lens 1. When the cap 40 is attached to the lens 1, an upper surface 41 of the cap 40 is placed at a higher position than the position of the surface of the second lens surface R2 of the lens 1 (namely, closer to the optical disk). Therefore, even if the optical disk is inclined to the second lens surface R2 of the lens 1, the optical disk does not contact with the lens 1.

Further, a surface for detecting inclination 21 (a third flat surface portion) which is a ring-shaped surface perpendicular to the optical axis AX of the lens 1 is formed around a periphery of the second lens surface R2. During attachment of the lens 1 to the lens holder 110, it can be detected whether the lens 1 is inclined with respect to the lens holder 110 based on an angle of reflected light by irradiating a laser beam to the surface for detecting inclination 21. An inclination of the lens 1 is adjusted based on a result of the above detection.

Next, a lens forming metal mold of the lens 1 and a method of forming a lens using the metal mold are explained. In this embodiment, the lens 1 is made of a plastic, and the lens 1 is formed by mold injection. A sectional view of the lens 1 and the metal mold for forming the lens 1 are shown in FIG. 2.

Figure 2:
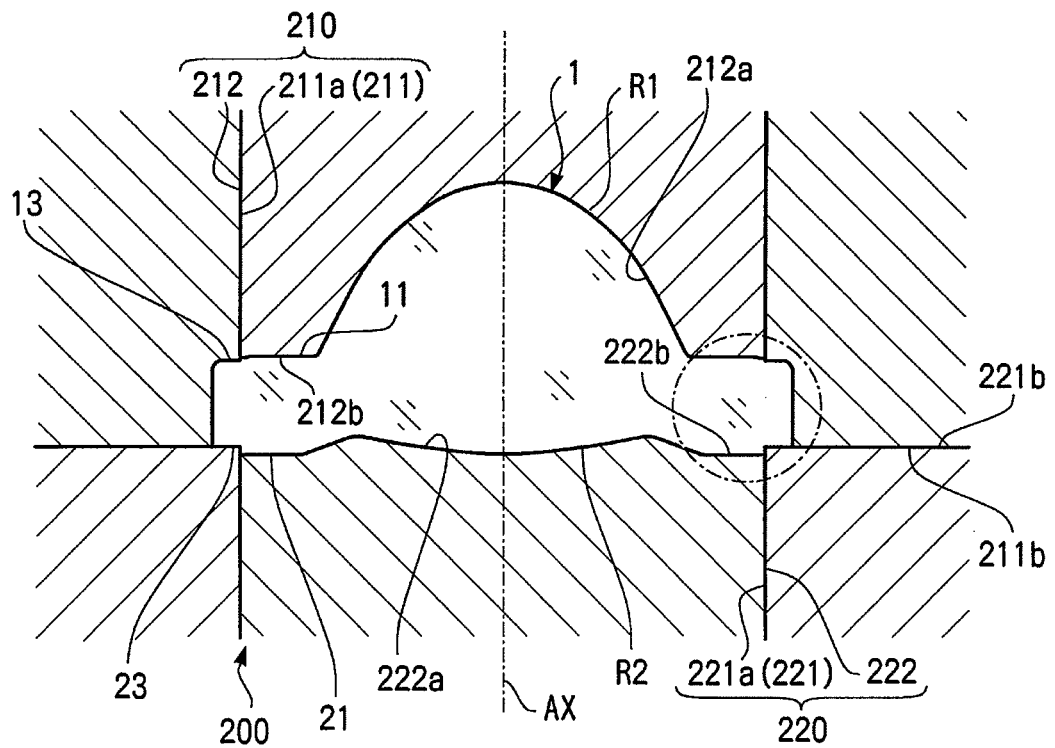
FIG. 2 is a sectional view of lens forming metal molds and a lens which is formed by using the lens forming metal molds.

As shown in FIG. 2, the metal mold 200 includes an upper metal mold portion 210 and a lower metal mold portion 220. The upper metal mold portion 210 includes an outer metal mold (up) 211 and an inner metal mold (up) 212. The outer metal mold (up) 211 has a hole 211a, and the inner metal mold (up) 212 is formed such that the inner metal mold (up) 212 is placed inside the hole 211a of the outer metal mold (up). Additionally, the lower metal mold portion 220 includes an outer metal mold (down) 221 and an inner metal mold (down) 222. The outer metal mold (down) 221 has a hole 221a, and the inner metal mold (down) 222 is formed such that the inner metal mold (down) 222 is placed inside the hole 221a of the outer metal mold (down) 221. Both of a lower surface 211b of the outer metal mold (up) 211 and an upper surface 221b of the outer metal mold (down) 221 are surfaces perpendicular to the optical axis AX of the lens 1. The outer metal mold (up) 211 is held on the outer metal mold (down) 221 through contacting the lower surface 211b of the outer metal mold (up) 211 with the upper surface 221b of the outer metal mold (down) 221.

A concaved portion 212a for forming the first lens surface R1 of the lens 1 and a planer portion 212b for forming the mounting surface 11 are formed with the inner metal mold (up) 212. Further, a concaved portion 222a for forming the second lens surface R2 of the lens 1 and a planer portion 222b for forming the surface for detecting inclination 21 are formed with the inner meal mold (down) 222.

In the embodiment, the inner metal mold (up) 212 is movable with respect to the outer metal mold (up) 211 along the direction of the optical axis AX of the lens 1. Similarly, the inner metal mold (down) 222 is movable with respect to the outer metal mold (down) 221 along the direction of the optical axis AX of the lens 1. The lenses 1 with various thicknesses can be formed by moving the inner metal mold (up) 212 and the inner metal mold (down) 222 along the direction of the optical axis AX of the lens 1.

Further, both of an inner circumferential surface of the hole 211a of the outer metal mold (up) 211 and an inner circumferential surface of the hole 221a of the outer metal mold (down) 221 are placed on a same cylindrical surface centered by the optical axis AX. With such a configuration, both of the holes 211a and 221a can be formed at the same time by overlapping the outer metal mold (up) 211 and the outer metal mold (down) 221 and punching them with a drill. And, the inner circumferential surfaces of the holes 211a and 221a become concentric cylindrical surfaces with extreme precision by mirror surface finishing of the hole 211a and 221a while the outer metal mold (up) 211 and the outer metal mold (down) 211 are overlapped. In this manner, since the holes 211a and 221a are concentrically formed with extreme precision, the inner metal mold (up) 212 and the inner metal mold (down) 222 are positioned with high accuracy by the holes 211a and 221a in a state where the inner metal mold (up) 212 is attached to the hole 211a and the inner metal mold (down) 222 is attached to the hole 221a. And, the concaved portion 212a of the inner metal mold (up) 212 and the concaved portion 222a of the inner metal mold (down) 222 are assembled to the outer metal mold (up) 211 and the outer metal mold (down) 221, respectively, without eccentricity. Consequently, the formed lens 1 becomes a lens such that an optical axis of the first lens surface R1 coincides with an optical axis of the second lens surface R2 with extreme precision.

In the embodiment, as described above, the metal mold 200 is formed by assembling the outer metal molds and inner metal molds. Therefore, when the lens 1 is formed by injecting a resin into an inside of the metal mold 200, the resin flows into a gap between the outer metal mold (up) 211 and the inner metal mold (up) 212 and a gap between the outer metal mold (down) 221 and the inner metal mold (down) 222, and burrs occur on the lens 1.

In the embodiment, heights of the burrs are regulated so as to prevent the burrs from protruding from the mounting surface 11 and the surface for detecting inclination 21. A configuration of the metal molds for regulating the heights of the burrs is explained below.

Figure 3:
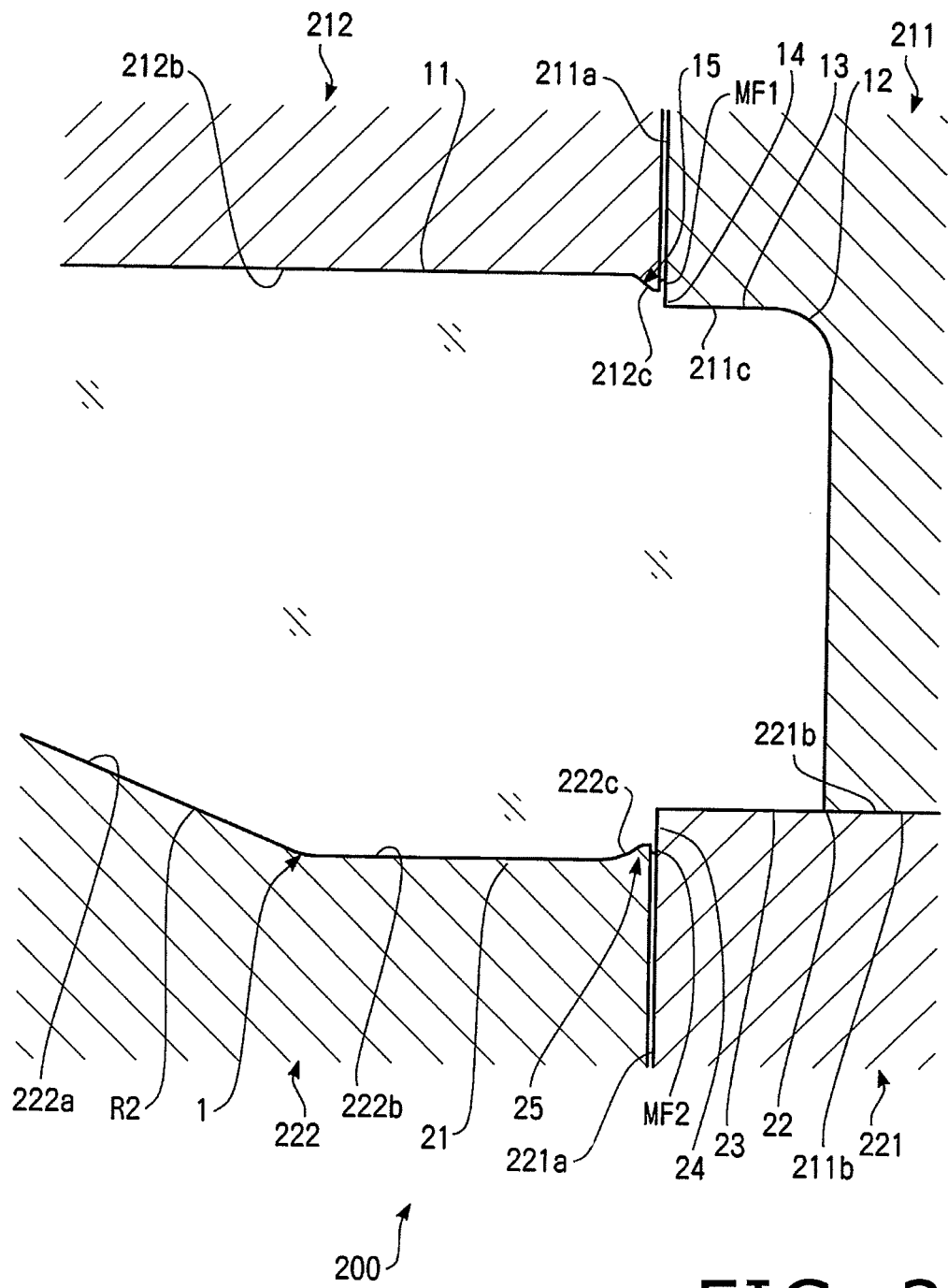
FIG. 3 is a magnified view of the lens forming metal molds and the lens at a dashed line circle portion of FIG. 2.

FIG. 3 is a magnified sectional view corresponding to a dashed line circle portion of FIG. 2 of the lens 1 and the metal mold 200. In the embodiment, a first outer circumferential surface portion 13 (a second flat surface portion) is formed as a ring-shaped surface, around the outer circumference of the mounting surface 11. Further, a second outer circumferential surface portion 23 (a fourth flat surface portion) is formed as a ring-shaped surface, around the outer circumference of the surface for detecting inclination 21. Both the first outer circumferential surface portion 13 and the second outer circumferential surface portion 23 are surfaces which are perpendicular to the optical axis AX (FIG. 1) of the lens 1. Further, as shown in FIG. 2, the first outer circumferential surface portion 13 is placed closer to the side of the second lens surface R2 (downward in the figure) than the mounting surface 11. Similarly, the second outer circumferential surface 23 is placed closer to the side of the first lens surface R1 (upward in the figure) than the surface for detecting inclination 21. This is for ensuring the molten resin to pervade the whole of the inside of the metal mold 200, when the lens 1 is formed. Therefore, a first cylindrical surface 14 is formed between the mounting surface 11 and the first outer circumferential surface portion and the second cylindrical surface 24 is formed between the surface for detecting inclination 21 and the second outer circumferential surface portion, respectively.

As shown in FIG. 2, the first cylindrical surface 14 is formed by the hole 211a of the outer metal mold (up) 211, and the second cylindrical surface 24 is formed by the hole 221a of the outer metal mold (down) 221. Further, the first outer circumferential surface portion 13 is formed by an outer circumferential surface portion forming surface 211c, which is a surface perpendicular to the optical axis AX (FIG. 2). Furthermore, the second outer circumferential surface portion 23 is formed by the upper surface 221b of the outer metal mold (down) 221. As described above, the metal mold 200 is formed with the outer metal mold (up) 211, the inner metal mold (up) 212, the outer metal mold (down) 221, and the inner metal mold (down) 222. Therefore, burrs MF1 and MF2, which can be formed, when the lens 1 is formed, at the sides of the first lens surface R1 and the second lens surface R2, respectively, are formed on extension surfaces of the first cylindrical surface 14 and the second cylindrical surface 24, which are respective joints of the molds, respectively, as shown in FIG. 3.

In the embodiment, a protruded portion 212c having a taper surface is formed all over the circumference around the outer periphery of the inner metal mold (up) 212 (namely, a portion neighboring to the hole 211a of the outer metal mold (up) 211), the taper surface being such that a point on the taper surface becomes closer to the second lens surface R2 as the point becomes farther from the optical axis AX of the lens 1. Similarly, a protruded portion 222c having a taper surface is formed all over the circumference around the outer periphery of the inner metal mold (down) 222 (namely, a portion neighboring to the hole 221a of the outer metal mold (down) 221), the taper surface being such that a point on the taper surface becomes closer to the first lens surface R1 as the point becomes farther from the optical axis AX of the lens 1. Therefore, since the above protruded portions 212c and 222c are formed around the outer peripheries of the inner metal mold (up) 212 and the inner metal mold (down) 222, a first concaved portion 15 and a second concaved portion 25, corresponding to the protruded portions 212c and 222c, respectively, are formed at a corner portion between the first cylindrical surface 14 and the mounting surface 11 and at a corner between the second cylindrical surface 24 and the surface for detecting inclination 21, respectively.

In the embodiment, the first concaved portion 15 and the second concaved portion 25, which can be clearance for the burrs, are formed at the positions where the burrs MF1 and MF2 can be formed. Therefore, the burr MF1 occurs at a position shifted toward the side of the second lens surface R2 (FIG. 1) from the position of the mounting surface 11, corresponding to an amount of the first concaved portion 15. Therefore, heights of tips of the burr MF1 from the first outer circumferential surface portion 13 are regulated to be low. Thus the tips of the burr MF1 do not protrude from the mounting surface 11. Hence, even if the burr MF1 is not removed, it can be ensured that the mounting surface 11 contacts with the holding surface 111 (FIG. 1) of the lens holder 110. Further, the burr MF2 occurs at a position shifted toward the side of the first lens surface R1 (FIG. 1) from the position of the surface for detecting inclination 21, corresponding to an amount of the second concaved portion 25. Therefore, heights of tips of the burr MF2 from the second circumferential surface portion 23 are regulated to be low. Thus the tips of the burr MF2 do not protrude from the surface for detecting inclination 21. Hence, even if the burr MF2 is not removed, positions of the tips of the burr MF2 are lower than position of the upper surface 41 of the cap 40 (FIG. 1).

Further, in the embodiment, the protruded portion 212c and the protruded portion 222c have the above taper surfaces, but the present invention is not limited to these shapes. An effect of the present invention can be achieved by protruded portions which are merely steep protrusions. However, the protruded portions 212c and 222c of the embodiment has advantages such that a lens can be easily detached from a mold when punching out after forming the lens, or, production requirements for manufacturing the metal mold 200 are less.

Additionally, in the embodiment, the mounting surface 11, the surface for detecting inclination 21, the first outer circumferential surface 13 and the second outer circumferential surface 23 are ring-shaped surfaces. However, these surfaces are not necessarily ring-shaped surfaces, but they can be circular surfaces of different shapes.

This application claims priority of Japanese Patent Application No. P2010-049046, filed on Mar. 5, 2010. The entire subject matter of the applications is incorporated herein by reference.

What is claimed is:

1. A mold for forming a lens, the lens being made of resin and the lens having a first lens surface and a second lens surface, the second lens surface formed on a reverse side of the first lens surface, the metal mold comprising:
   a first inner metal mold which forms the first lens surface and a first flat surface portion, the first flat surface portion being formed around an outer periphery of the first lens surface, and the first flat surface portion being a ring-shaped surface perpendicular to an optical axis of the lens;
   a first outer metal mold which forms a second flat surface portion, the second flat surface portion being formed around an outer periphery of the first flat surface portion and positioned closer to a side of the second lens surface than the first flat surface portion, and the second flat surface portion being a ring-shaped surface perpendicular to the optical axis of the lens;
   a second inner metal mold which forms the second lens surface and a third flat surface portion, the third flat surface portion being formed around an outer periphery of the second lens surface, and the third flat surface portion being a ring-shaped surface perpendicular to the optical axis of the lens, and
   a second outer metal mold which forms a fourth flat surface portion, the fourth flat surface portion being formed around an outer periphery of the third flat surface portion and positioned closer to a side of the first lens surface than the third flat surface portion, and the fourth flat surface portion being a ring-shaped surface perpendicular to the optical axis of the lens,
   wherein a first protruded portion which forms a first concaved portion on the lens is formed all around an outer periphery of the first inner metal mold, the first concaved portion serving as clearance for a burr at a boundary of the first outer metal mold and the first inner metal mold when the lens is formed,
   wherein a second protruded portion which forms a second concaved portion on the lens is formed all around an outer periphery of the second inner metal mold, the second concaved portion serving as clearance for a burr at a boundary between the second outer metal mold and the second inner metal mold when the lens is formed;
   the first protruded portion has a tapered surface that projects farther from the first inner metal mold as the tapered surface of the first protruded portion extends farther from the optical axis of the lens; and
   the second protruded portion has a tapered surface that projects farther from the second inner metal mold as the tapered surface of the second protruded portion extends farther from the optical axis of the lens;
   a tip of the first protruded portion nearest to the second lens surface is positioned on the first lens surface side with respect to the second flat surface portion in the optical axis direction; and
   a tip of the second protruded portion nearest to the first lens surface is positioned on the second lens surface side with respect to the fourth flat surface portion in the optical axis direction.

2. The metal mold for forming the lens according to claim 1,
   wherein a hole formed in the first outer metal mold for accommodating the first inner metal mold therein and a hole formed in the second outer metal mold for accommodating the second inner metal mold therein are circular holes having same diameters, each of the circular holes being formed to have a center equal to a position of the optical axis of the lens.

3. A lens forming method, comprising:
   forming the lens by injecting a molten resin material into the metal mold for forming the lens according to claim 1.

4. The lens forming method according to claim 3,
   wherein a hole formed in the first outer metal mold for accommodating the first inner metal mold therein and a hole formed in the second outer metal mold for accommodating the second inner metal mold therein are circular holes having same diameters, each of the circular holes being formed to have a center equal to a position of the optical axis of the lens.

* * * * *